United States Patent [19]

Gibbs et al.

[11] 4,312,193
[45] Jan. 26, 1982

[54] TORQUE TRANSFER DEVICE FOR FLEXIBLE SHAFT COUPLINGS

[75] Inventors: Ralph H. Gibbs, Boulder; Robert E. Stuemky, Elizabeth, both of Colo.

[73] Assignee: The Gates Rubber Company, Denver, Colo.

[21] Appl. No.: 92,115

[22] Filed: Nov. 7, 1979

[51] Int. Cl.³ .............................................. F16D 3/18
[52] U.S. Cl. .................................. 64/9 R; 64/11 R; 64/1 C
[58] Field of Search .................... 64/9 R, 11 R, 28 R, 64/1 C, 30 C, DIG. 1

[56] References Cited

U.S. PATENT DOCUMENTS

| 2,421,546 | 6/1947  | Dalton ................................ 64/9 R |
| 3,267,697 | 8/1966  | Oldberg et al. ..................... 64/15 C |
| 3,331,217 | 7/1967  | Wildhaber .......................... 64/9 R |
| 3,628,352 | 12/1971 | Stuemky ............................. 64/15 C |
| 3,855,817 | 12/1974 | Stuemky et al. .................... 64/11 B |
| 4,027,502 | 6/1977  | Stuemky ............................. 64/7 |
| 4,133,188 | 1/1979  | Cartwright ......................... 64/13 |

FOREIGN PATENT DOCUMENTS 2327441  6/1977  France ................................ 64/9 R Primary Examiner—Charles J. Myhre
Assistant Examiner—Magdalen Moy
Attorney, Agent, or Firm—H. W. Oberg, Jr.; Raymond Fink; Curtis H. Castleman, Jr.

[57] ABSTRACT

A sporadical torque transfer device for yielding element flexible shaft couplings of the tubular type, the device including first and second sleeves which have a ring of internal spline teeth at one end and circumferentially spaced jaw teeth at the opposite end, the first and second sleeves arranged substantially coaxial so that the jaw teeth mesh with each other in jaw coupling fashion, and a third sleeve that fits within the first and second sleeve juxtaposed the jaw teeth as a means for coaxially aligning the first and second sleeves.

7 Claims, 3 Drawing Figures

TORQUE TRANSFER DEVICE FOR FLEXIBLE SHAFT COUPLINGS

BACKGROUND OF THE INVENTION

The invention relates to flexible shaft couplings of the tubularly-shaped, yielding element type, but more particularly, the invention relates to a sporadical torque transferring device that enhances performance of a tubularly-shaped, yielding type flexible shaft coupling.

Some yielding element type flexible shaft couplings are useful for attenuating certain noise and vibration in some rotary, articulated shaft systems. Examples of such flexible elements appear in U.S. Pat. Nos. 3,628,352; 3,855,817; 3,347,061; and 3,621,674. Apparatus for attaching such yielding element couplings to rotary shafting are shown in U.S. Pat. Nos. 3,788,098; and 3,973,411. An example of a torque overload device for tubularly-shaped yielding element couplings appears in U.S. patent application Ser. No. 34,069. While such couplings are suitable for attenuating noise and vibration, the couplings are susceptible to buckling failure at infrequent torque overloads. The torque overload device of the above referenced application solves many of the infrequent torque overload problems; however, such torque overload devices may possibly disengage when used with flexible element couplings having a torsional spring rate less than about 100 foot pounds per degree. Another drawback to such overload devices is that they may not accommodate some of the interconnecting articulated shaft length building tolerances which occur in some applications such as half shafts for use with automobile front wheel drives.

SUMMARY OF THE INVENTION

In accordance with the invention, a sporadical or intermittent torque transferring device is provided for use with tubularly-shaped, yielding element flexible shaft couplings. The device is disposed in the yielding element tubular bore and arranged generally coaxially therewith. The device has coaxial sleeves with interdigitating jaw teeth at a first end of the sleeves and a ring of internal splined teeth at opposite ends of the first and second sleeves. A third sleeve is optionally, but preferably, adapted to fit within the first and second sleeves juxtaposed the interdigitating jaw teeth. A predetermined amount of clearance is provided between the jaw teeth to allow angular rotational movement between the first and second sleeves.

In use, splined shaft portions extend through opposite ends of the yielding element tubular bore and each engage a different ring of splined teeth. At torque overloads that correspond to a predetermined yielding of the yielding element, the jaw teeth engage each other to transfer torque directly between the splined shaft portions.

Optionally, but preferably, the ring of splined teeth have tooth flanks which taper to end portions to accommodate angular misalignment with a spline shaft.

An advantage of the invention is that spaced rings of splined teeth accommodate a large axial spacing (i.e., build tolerance) between shaft portions interconnected with the flexible coupling.

An unexpected advantage of the invention is that subjectively, the mechanically engaging ring of spline teeth do not transmit objectionable noise between two shaft portions interconnected with a yielding element type coupling.

These and other advantages or objects of the invention will be apparent after reviewing the drawings and description thereof wherein.

DESCRIPTION OF PREFERRED EMBODIMENTS

Figure 1:
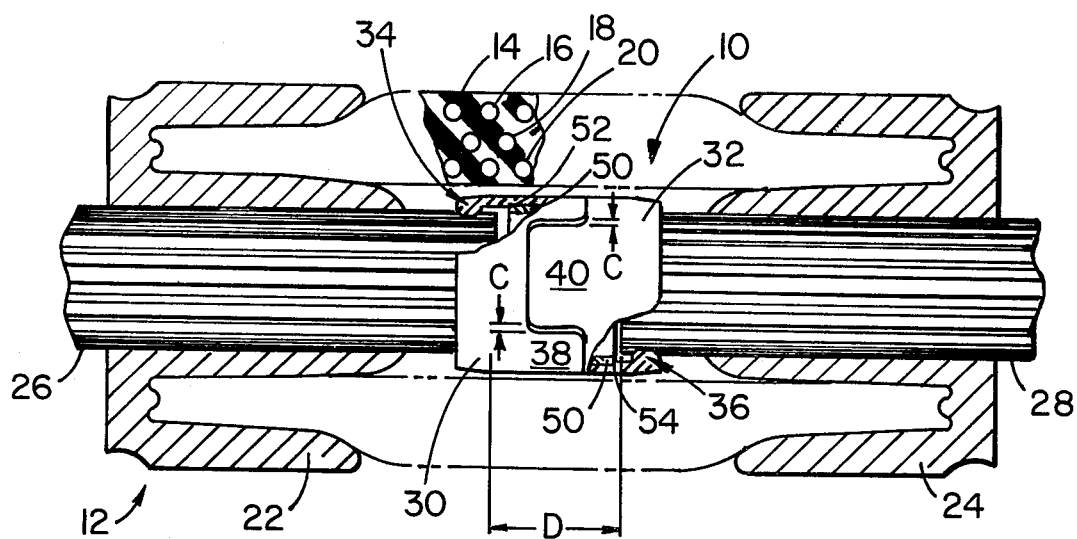
FIG. 1 is an axial side view in partial section showing the invention with a flexible shaft coupling of the yielding element, tubular type.
Figure 2:
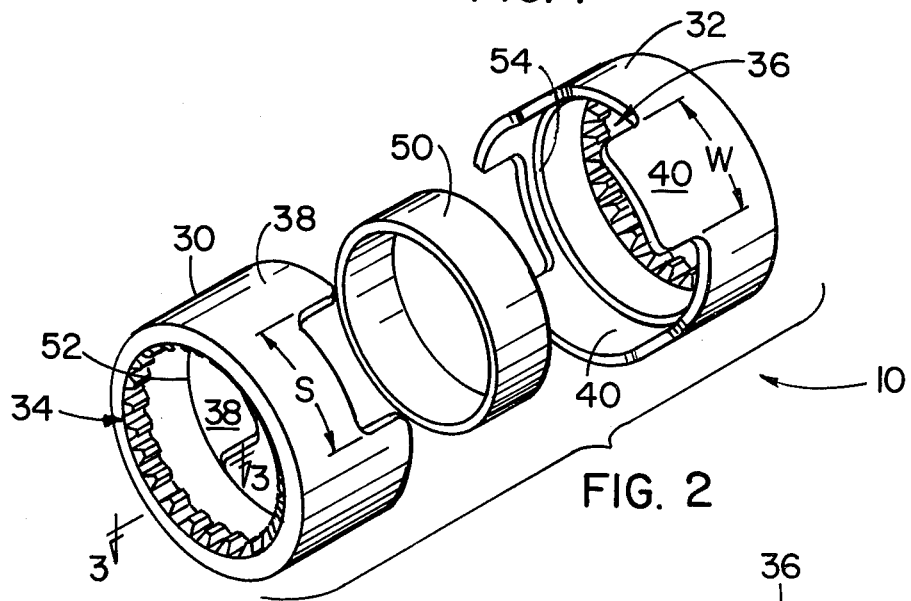
FIG. 2 is an exploded isometric view of the torque overload device of the invention.
Figure 3:
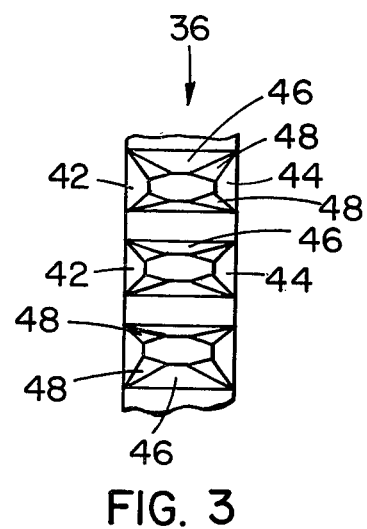
FIG. 3 is an enlarged partial view taken along the line 3—3 of FIG. 2.

Referring to the Figures, a sporadical torque transfer device 10 is provided for flexible shaft coupling 12 of the yieldable tubular element type. Preferably, the yielding flexible element 14 is generally of the type as disclosed in U.S. Pat. No. 3,628,352 where oppositely wound spiral spring elements are disposed in a polymeric matrix of generally tubular shape. Flexible elements of this type usually have three or more distinct annular layers of spirally wound spring elements 16, 18, 20 that are sensitive to the direction of rotation of the flexible coupling. For example, in one direction of rotation the outermost spring element 16 winds down to a smaller annular diameter and the spring element 18 inward thereto unwinds to a larger annular diameter such that the two adjacent spring elements 16, 18 press against each other or "pair" to enhance the torque carrying capability of the flexible element. Opposite rotation of the coupling reverses the winding and unwinding direction of the various spring elements causing spring element 18 to wind to a smaller diameter and "pair" with circumjacent spring elements 20 as it unwinds to a larger diameter. Torque transferring devices of the invention are especially suited for such "pairing" spring systems because they enhance the torque carrying capabilities of the flexible element as will later be explained.

Coupling members 22, 24 are attached to each end of the flexible element. The coupling members grip the flexible element to transfer torque between attachable shafts 26, 28. The shaft may attach to the coupling members in any suitable manner such as splines, interference fit, bolts, pins and the like. Most preferably, the shafts attach to the coupling members with an external spline.

Each shaft has a portion that extends past the coupling member towards a center portion of the coupling member and engage the torque transfer device of the invention.

The device is optionally a two, but preferably a three-component system using three sleeve members. Two of these sleeve members 30, 32 each have a ring of internal spline teeth 34, 36 that project from one end portion of the sleeve. Circumferentially spaced jaw teeth 38, 40 extend from the opposite end of the sleeve. The circumferential spacing S between the jaw teeth is greater than the circumferential width W of the jaw teeth. The two sleeves are arranged substantially coaxially with each other and are oriented so that the jaw teeth interdigitate with each other in jaw coupling fashion. The difference in circumferential spacing and tooth width provides a predetermined clearance C between the jaw teeth. The clearance C between the teeth is chosen as a function of the torsional resistance of the flexible element being used. For example, the cumulative angular clearance (e.g., 2 times C) may be in the order of 8-20 degrees between the juxtaposed tooth faces. While any number of jaw teeth may be used, three have proven to be adequate.

The internal spline teeth optionally have end portions 42, 44 which are circumferentially beveled for ease of interfitting with an externally splined shaft. Optionally, and most preferably, the spline teeth have tooth flanks 46 which taper 48 toward each end portion to accommodate angular misalignment with the sleeve and interconnecting shaft portion.

A third sleeve 50 is optionally arranged substantially coaxial with the interdigitating sleeves and has an external diameter that fits within an internal diameter of the interdigitating sleeves. The third sleeve is positioned juxtaposed the interdigitating teeth and defines a preferable means for keeping the first two sleeves in substantial coaxial alignment.

Optionally, end portions of the third sleeve abut a shoulder 52, 54 formed at the internal diameter of the first and second sleeves to retain the third sleeve in its desired axial position.

While the first and second sleeves may have any spline configuration to interfit with the desired shaft and any tooth spacing in configuration to interdigitate with each other, it is preferred that the sleeves be substantially identical. Moreover, it is preferred that these sleeves be substantially hermaphroditic so that they are freely interchangeable with each other.

In use, the flexible coupling is assemblied with the splined shafts as shown. Torque is applied to one shaft and transferred to the second shaft causing the yielding flexible element to twist. At a predetermined torque load, the yielding flexible element twists a predetermined number of degrees intermediate its coupling members. The degrees of twist is less than the number of degrees of clearance provided between the jaw teeth driving faces whether or not the shafts are angularly misaligned relative to each other.

The interdigitating jaw teeth do not normally come into contact with each other except for two different types of operating conditions. The cumulative angular clearance between the jaw teeth may be chosen relatively small (e.g., 3°-8°) so that the jaw teeth contact each other at low torque levels to substantially limit the torque carried by the flexible element. In this situation the teeth act as a torque overload limiting device for the flexible element.

In the second operating condition, the cumulative angular clearance between the jaw teeth may be chosen somewhat larger (e.g., 8°-16°) so that the jaw teeth only operate to carry spurious unforeseen high torque overload that could fail or cause serious damage to the yielding element. Whatever the case, the torsional spring rate of the yielding element is considered when chosing the clearance between the jaw teeth.

Another important operating aspect of the device of the invention is its ability to accommodate variances of axial distance D between the shaft portions. The shaft end portions may just engage the ring of internal spline teeth or they may extend to a point approaching a middle portion of the device between the rings of splined teeth. The ability to accommodate various positions of the shaft end portions permit the torque overload device to also function as a means for accommodating building tolerances in certain machine applications such as half shafts location for front wheel drive automobiles.

The foregoing description is provided for purpose of illustration only and is not intended to limit the scope of the invention which is to be determined from the appended claims.

What is claimed is:

1. A torque transfer device for tubular, yielding element flexible shaft couplings comprising:
   first and second sleeves which each have an internal diameter and opposite end portions, a ring of internal spline teeth projecting at one end portion that define a means for securing the sleeve from rotation relative to an end of the yielding element and circumferentially spaced jaw teeth, projecting from the opposite end portion and having a circumferential width less than the circumferential spacing to provide a desired clearance, the first and second sleeves always substantially coaxially arranged and adapted so that the jaw teeth interdigitate with each other in jaw coupling fashion.

2. The torque transfer device as claimed in claim 1 which further includes: a thrid sleeve having an outside diameter that fits within the internal diameters of the first and second sleeves, the third sleeve disposed juxtaposed the jaw teeth and defining a means for substantially coaxially aligning the first and second sleeves.

3. The torque transfer device as claimed in claim 1 wherein the spline teeth have end portions and tooth flanks tapered toward the end portions.

4. The torque transfer device as claimed in claim 3 wherein the spline teeth end portions are circumferentially beveled.

5. The torque transfer device as claimed in claim 1 wherein the first and second sleeves are substantially identical.

6. The torque transfer device as claimed in claim 5 wherein the first and second sleeves are hermaphroditic.

7. The torque transfer device as claimed in claim 2 wherein the first and second sleeves have an internal shoulder that abuts end portions of the third sleeve.

* * * * *